United States Patent
Bennett et al.

(10) Patent No.: US 7,852,416 B2
(45) Date of Patent: Dec. 14, 2010

(54) CONTROL DEVICE WITH LANGUAGE SELECTIVITY

(75) Inventors: James D. Bennett, Jungmannova (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1325 days.

(21) Appl. No.: 11/290,297

(22) Filed: Nov. 30, 2005

(65) Prior Publication Data

US 2007/0124777 A1    May 31, 2007

(51) Int. Cl.
*H04N 5/44*     (2006.01)
*H04N 5/445*    (2006.01)

(52) U.S. Cl. .................... 348/734; 348/462; 348/14.05; 348/739; 348/552; 348/14.04; 725/153

(58) Field of Classification Search ................. 348/734, 348/552, 553, 462, 739, 14.03, 14.04, 14.05; 725/153, 78
See application file for complete search history.

(56) References Cited

U.S. PATENT DOCUMENTS

| | | | | |
|---|---|---|---|---|
| 4,712,105 A | * | 12/1987 | Kohler | 340/825.69 |
| 5,410,326 A | * | 4/1995 | Goldstein | 348/734 |
| 5,710,605 A | * | 1/1998 | Nelson | 348/734 |
| 5,838,384 A | * | 11/1998 | Schindler et al. | 348/563 |
| 5,867,223 A | | 2/1999 | Schindler et al. | |
| 7,260,829 B1 | * | 8/2007 | Hendricks et al. | 725/152 |
| 7,487,527 B2 | * | 2/2009 | Ellis et al. | 725/38 |

FOREIGN PATENT DOCUMENTS

| | | |
|---|---|---|
| CN | 1309866 | 8/2001 |
| CN | 1371572 | 9/2002 |
| EP | 1185138 B1 | 3/2002 |
| JP | 11098434 B1 | 4/1999 |
| WO | 00/04707 B1 | 1/2000 |
| WO | 01/06788 B1 | 8/2007 |

* cited by examiner

*Primary Examiner*—David L Ometz
*Assistant Examiner*—Jean W Désir
(74) *Attorney, Agent, or Firm*—McAndrews, Held & Malloy, Ltd.

(57) ABSTRACT

A control device that interacts with an entertainment system. The entertainment system drives a speaker device. The control device has a user interface that receives a user input identifying an audio selection and a language. At least one module of the control device transmits a control signal adapted to cause playing of audio information corresponding to the audio selection in the language identified by the user input on the entertainment system. The entertainment system may in addition drive a plurality of speaker devices. The control device may receive an additional language selection and cause playing of the audio information in a plurality of languages corresponding to the additional language selection on the plurality of speaker devices. Also for example, the control device may drive a second plurality of speaker devices. The control device may be adapted to receive media guide information and/or language guide information and present such information to a user.

23 Claims, 9 Drawing Sheets

CONTROL DEVICE WITH LANGUAGE SELECTIVITY

CROSS-REFERENCE TO RELATED APPLICATIONS/INCORPORATION BY REFERENCE

The present application is related to U.S. patent application Ser. No. 11/290,974, filed Nov. 30, 2005, titled "PARALLEL TELEVISION REMOTE CONTROL," U.S. patent application Ser. No. 11/289,971, filed Nov. 30, 2005, titled "PHONE BASED TELEVISION REMOTE CONTROL," U.S. patent application Ser. No. 11/289,848, filed Nov. 30, 2005, titled "PARALLEL TELEVISION DOCKING ADAPTER," with and U.S. patent application Ser. No. 11/290,079, filed Nov. 30, 2005, titled "UNIVERSAL PARALLEL TELEVISION REMOTE CONTROL," each of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

Various aspects of the present invention relate to controlling delivery of multimedia information in a plurality of languages to a multimedia entertainment system.

2. Description of the Related Art

A typical television remote control has multiple predefined buttons. A remote control is used to control settings and display of video on a television screen and playing of audio on a television speaker. The remote control sends a control signal to the television when buttons of the remote control are selected. The control signal triggers the television to perform one or more functionalities in accordance with the selected buttons. The remote control interacts with the television using infrared or radio frequency transmission. Range of an infrared transmission and radio frequency transmission is typically a few meters.

The television is used to view or listen to videos and audios sourced by television channel broadcasters. Cable TV (television) broadcasters and satellite TV broadcasters typically allow the television to receive channels via a set top box. A user, via direct interaction or via a remote control device, controls the set top box. The set top box provides information via the television screen and/or the television speaker. The user looks back and forth between the remote control and the television screen to locate buttons of the remote control and input selection. The television is used to view or listen to videos and audios played on a VCD (Video Compact Disc) player, a DVD (Digital Video Disc) player, etc. The remote control is used to control settings of the VCD player and the DVD player as well.

Some of these media sources, such as media broadcasters, provide a program in more than one language. The television typically receives the program in a single language and plays the received program on the television speaker. Most of the time, the language in which the television receives the program is predefined. This arrangement is not ideal, for example, in a public area or in a multi-lingual family setting where more than one person, each having a preference for a respective language, is watching the program on the television.

DVDs and VCDs, for example, sometimes contain a movie with multiple audio tracks corresponding to a video track. The multiple audio tracks correspond to an audio portion of the movie recorded and stored in different languages. A remote control that controls settings of the DVD player causes an audio portion of the movie stored on the DVD to be heard in a single language on a speaker to which the DVD player is connected.

Further limitations and disadvantages of conventional and traditional approaches will become apparent to one of ordinary skill in the art through comparison of such systems with various aspects of the present invention.

BRIEF SUMMARY OF THE INVENTION

A remote control device that interacts with a television and/or a media source, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
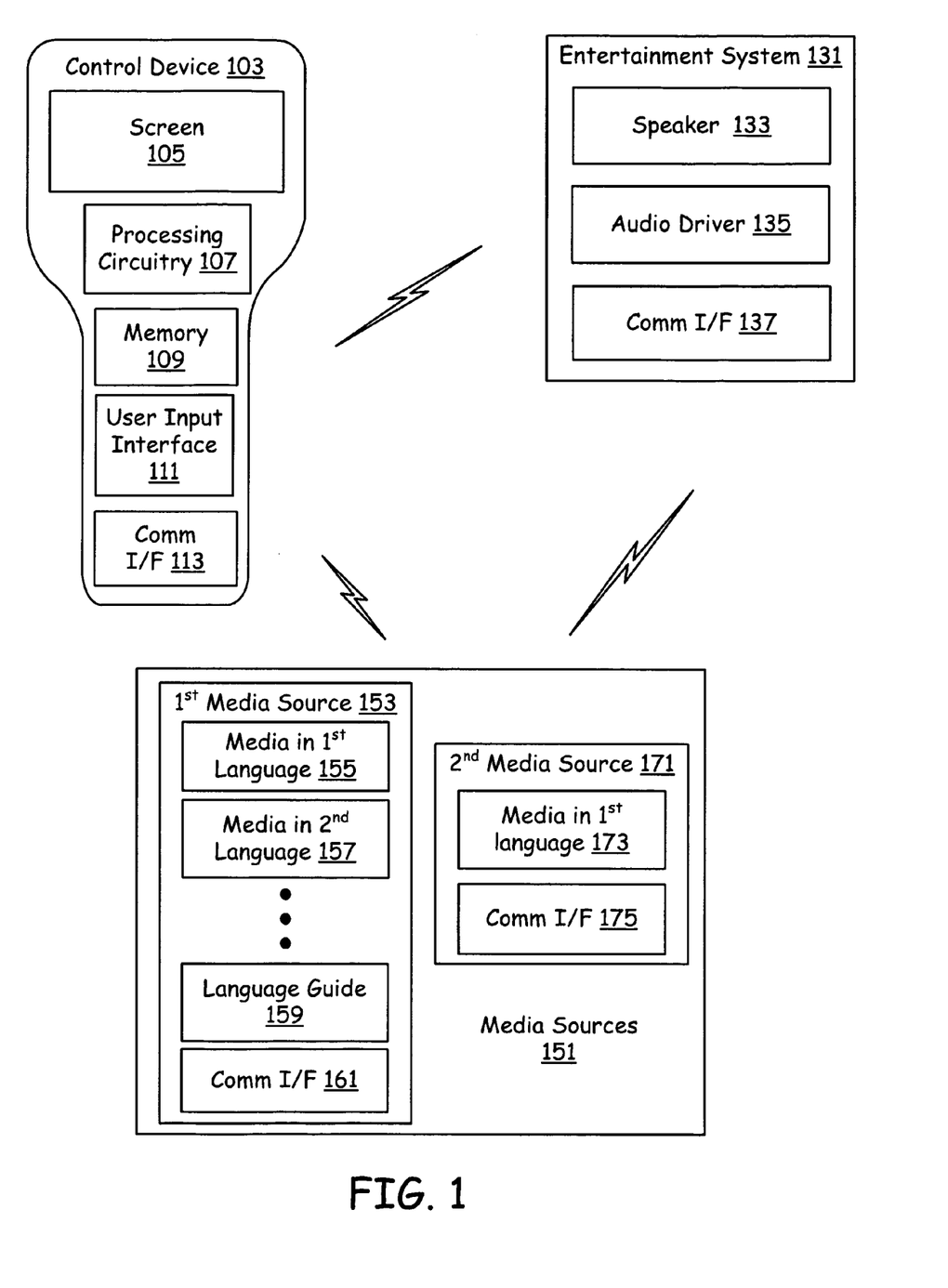
FIG. 1 is a schematic block diagram illustrating interaction between a control device that controls selection of a language for an audio element that is played on an entertainment system, the entertainment system and media sources that supply the audio element to the entertainment system in accordance with various aspects of the present invention.

FIG. 1 is a schematic block diagram illustrating interaction between a control device 103 that controls selection of a language for an audio element that is played on an entertainment system 131, the entertainment system 131 and media sources 151 that supply the audio element to the entertainment system 131. The control device 103 comprises a screen 105, processing circuitry 107 (e.g., which may comprise various hardware and/or software modules), a memory 109, a user input interface 111 and a communication interface 113. The entertainment system 131 comprises a speaker 133, an audio driver 135 and a communication interface 137. The media sources 151 comprise a first media source 153 and a second media source 171. The first media source 153 comprises media in a plurality of languages, a language guide 159 and a communication interface 161. The second media source 171 comprises media in a single language and a communication interface 175.

The control device 103 is communicatively coupled to the first media source 153 via the communication interface 113 of the control device 103 and the communication interface 161 of the first media source 153 over a first communication link. The first communication link between the control device 103 and the first media source 153 may for example, comprise characteristics of an infrared link, a fiber optic link, a Bluetooth link, an IEEE 802.11 link, an IEEE 802.15 link, a GSM link, a GPRS link, a CDMA link, a microwave link, an Ethernet link, a copper link or any other standard or proprietary link. The entertainment system 131 interacts with the first media source 153 via the communication interface 137 of the entertainment system 131 and the communication interface 161 of the first media source 153 over a second communication link. The second communication link between the entertainment system 131 and the first media source 153 is one or more of a wireless link and a wired link (e.g., comprising characteristics of any of a variety of communication link types, such as those discussed previously with regard to the first communication link). The control device 103 and the entertainment system 131 are communicatively coupled to each other through the communication interface 113 of the control device 103 and the communication interface 137 of the entertainment system 131 over a third communication link. The control device 103 and the entertainment system 131 interact over, for example, an RF link, an infrared link, an Internet link, an Intranet link, a fiber optic link, a microwave link, a cellular phone link, a public network link or a dedicated link. In one embodiment, the control device 103 comprises two communication interfaces, one for communicating with the first media source 153 and another one for interacting with the entertainment system 131. In another embodiment, the entertainment system 131 comprises two communication interfaces, one for interacting with the first media source 153 and another one responding to the control device 103.

The control device 103 receives a first user input via the user input interface 111. The user input interface 111 is, for example and without limitation, one or a combination of a thumbwheel, a mouse, a touchpad, a pen, a voice based interface and a plurality of buttons. The first user input identifies a language guide perusal request (a user wants to view a language guide). The control device 103 requests the first media source 153 over the first communication link for a language guide 159. The language guide 159 identifies the plurality of languages in which a media is available in the first media source 153. The media may generally comprise characteristics of any of a variety of selectable units of media information (e.g., multimedia information). The media is, for example and without limitation, one or more of a television program, an audio file, a music video, a multimedia stream, a movie, a sporting or other entertainment event, a news report, an audio stream or any of a variety of units of recorded or live multimedia information. The plurality of languages may be, for example, English, Spanish, Chinese and French. The control device 103 receives the language guide 159 from the first media source 153 via the first communication link. The control device 103 displays the language guide on the screen 105. A user, who interacts with the control device 103 visually, learns the plurality of languages in which the media is available. The memory 109 stores the language guide 159.

The control device 103 subsequently receives a second user input via the user input interface 111. The second user input interface identifies a language. The processing circuitry 107 of the control device 103 generates a control signal and sends the control signal to the entertainment system 131 via the third communication link. The control signal directs the entertainment system 131 to receive the media in the selected language from the first media source 153. By way of example, the media is a news program broadcast by a radio channel broadcaster, and the language is Spanish. The user input interface 111, in this non-limiting example, is a plurality of numbered buttons. The language guide reveals a correspondence between the plurality of languages and some or all of the plurality of numbered buttons. The Spanish language corresponds to a third button among the plurality of numbered buttons. Selection of the third button (the second user input) tells the control device 103 that the selected language is Spanish. The entertainment system 131 receives the news program in the Spanish language using the second communication link and forwards the news program to the audio driver 135. The audio driver 135 plays the news program on the speaker 133. The first media source 153 is the radio channel broadcaster in this non-limiting example. The media may be a music file stored on a DVD (Digital Video Disc) and the language may be English. The entertainment system 131 receives the music file in English language and forwards the music file to the audio driver 135 for playing.

The control device 103 is located at a first premises, and the entertainment system 131 is located at a second premises. The media sources 151 are located at the second premises. In some embodiments, the media sources 151 are located at a third premises.

In another embodiment the control device 103 is communicatively coupled to the second media source 171. The second media source 171 stores media in a single language, for example and without limitation, in the English language. The language guide perusal request input via the user input interface 111 does not return a language guide to the control device 103. The entertainment system 131 receives a media in the single language (English language) from the second media source 171 via the communication interface 175 and the communication interface 137 of the entertainment system 131 and plays the media in the single language (English language) on the speaker 133.

Figure 2:
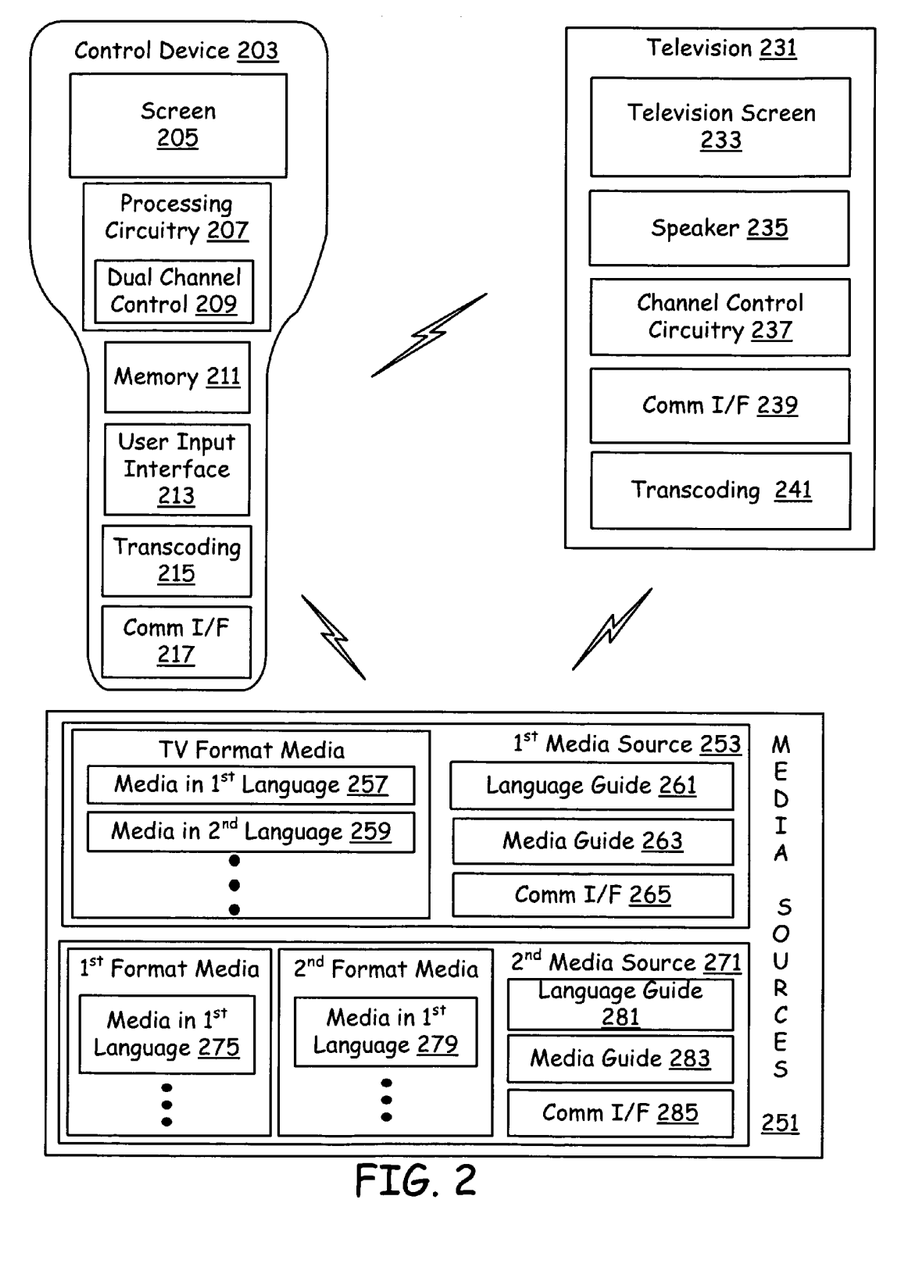
FIG. 2 is a schematic block diagram illustrating an embodiment of the control device of FIG. 1 where the entertainment system is a television and the control device further controls display on a screen of the television.

FIG. 2 is a schematic block diagram illustrating an embodiment of the control device 103 of FIG. 1 where the entertainment system 131 is a television 231 and the control device 203 further controls display on a screen 233 of the television 231. The control device 203 comprises a screen 205, processing circuitry 207, a memory 211, a user input interface 213, a transcoding unit 215 and a communication interface 217. The television 231 comprises a television screen 233, a speaker 235, channel control circuitry 237, a communication interface 239 and a transcoding unit 241. Media sources 251 comprise a first media source 253 and a second media source 271. The first media source 253 comprises a plurality of media elements in television format and each of the plurality of media elements in a plurality of languages. Media element 257, for example, is a media element in television format and in a first language. Media element 259, for example, is a media element in television format and in a second language. The first media source 253 comprises a language guide 261, a media guide 263 and a communication interface 265. The second media source 271 comprises another plurality of media elements in a first format and also in a second format, and each of the another plurality of media elements in another plurality of languages. Media element 275, for example, is a media element in the first format and in a first language. Media element 279, for example is a media element in the second format and in the first language. The second media source 271 comprises a language guide 281, a media guide 283 and a communication interface 285.

The media elements may, for example and without limitation, be one or more of a television channel, a radio program, a movie or an audio file. For example and without limitation, the first media source 253 is a satellite television channel broadcaster. The first media source 253 comprises a plurality of television channels (programs) with video portions of the plurality of television channels in HDTV (High Definition Television) format, a format supported by the television screen 233 and with audio portions of the plurality of television channels in MPEG-2 format, a format supported by an audio player of the television 231. The first media source 253 stores an audio portion of each of the plurality of television channels (the plurality of media elements), for example and without limitation, in English, in Spanish and in French (the plurality of languages). Media element 257, for example, is a television channel with a video portion of the television channel in HDTV format and with an audio portion of the television channel in MPEG-2 format and in the English language. Media element 259, for example, is the television channel with the video portion of the television channel in HDTV format and the audio portion of the television channel in MPEG-2 format and in the Spanish language.

For example and without limitation, the second media source 271 is a movie server. The second media source 271 comprises a plurality of movies with video portions of each of the plurality of movies stored in HDTV format and in a format that is supported by the control device screen 205. The control device screen format is typically the QVGA (Quarter Video Graphics Array) format. The second media source 271 stores an audio portion of each of the plurality of movies (the plurality of media elements), for example and without limitation, in MPEG-1 format and in German, in Dutch and in Chinese (the plurality of languages) languages. Media element 275, for example, is a movie with a video portion of the movie in HDTV format and an audio portion in MPEG-1 format and in the German language. Media element 279, for example, is the movie with the video portion of the movie in QVGA format and the audio portion in MPEG-1 format and in the German language.

The control device 203 receives a user input via the user input interface 213. The user input identifies one of the media sources 251, a media element from the one of the media sources 251, and a language for the television 231. The processing circuitry 207 generates a control signal and transmits the control signal. The television 231 receives the control signal. The control signal triggers the television 231 to receive the media element with an audio portion of the media element in the selected language from the one of the media sources. For example and without limitation, the user input identifies the first media source 253, a news channel and the French language. The television 231 receives the news channel with a video portion of the news channel in HDTV format and an audio portion of the news channel in MPEG-2 format and in the French language. The television 231 displays the video portion of the news channel in HDTV format on the television screen 233 and plays the audio portion of the news channel (which is in MPEG-2 format) in the French language on the speaker 235. In one embodiment, the user input is preceded by the control device 203 displaying the media guide 263 and the language guide 261 corresponding to the first media source 253 and the media guide 283 and the language guide 281 corresponding to the second media source 271 on the screen 205. The media guide 263 identifies the plurality of television channels available with the satellite television channel broadcaster (first media source 253), and the language guide 261 identifies the languages in which each of the plurality of television channels are available. The user input is based on the media guide 263 and the language guide 261. In another embodiment, each of the plurality of media elements in the first media source 253 is not available in all of the plurality of languages. For example and without limitation, an audio portion of a first television channel is available in the English language and in the Spanish language, and an audio portion of a second television channel is available in the English language and in the French language. The first media source 253 (the television channel broadcaster) in such cases comprises a separate language guide for each of the plurality of media elements. The first media source 253 comprises a first language guide for the first television channel and a second language guide for the second television channel.

The user input interface 213 receives a second user input that identifies the media element from the first media source 253 in the language for the control device 203. The video portion of the media element (the television channel) is in HDTV format. The screen 205 supports QVGA format. The control device 203 receives the television channel from the first media source 253 and the transcoding unit 215 converts the video portion of the television channel from the HDTV format to the QVGA format. The control device 203 displays the video portion of the television channel that has been converted to QVGA format on the screen 205.

The user input interface 213 receives a third user input that identifies a first media element from the second media source 271 in a first language for the television 231 and a second media element from the second media source 271 for the control device 203. For example, the third user input identifies a first movie from the movie server (the second media source 271) in the German language for the television 231 and a second movie for the control device 203. The television screen 233 supports HDTV format, and the audio player of the television supports MPEG-2 format, while the control device screen 205 supports QVGA format. The processing circuitry 207 of the control device 203 transmits a control signal. The control signal triggers the television 231 to retrieve the first movie from the movie server (the second media source 271) with a video portion of the first movie in HDTV format and an audio portion of the movie in MPEG-1 format and in the German language. Transcoding unit 241 of the television 231 converts the audio portion of the first movie from MPEG-1 to MPEG-2 format. The television 231 displays the video portion on the television screen 233 and plays the converted audio portion on the speaker 235. The control device 203 retrieves the second movie from the movie server (the second media source 271) with the video portion of the second movie in QVGA format and displays the video portion of the second movie on the screen 205. Dual channel control unit 209 enables the control device 203 to control display on the screen 205 and on the television screen 233.

Figure 3:
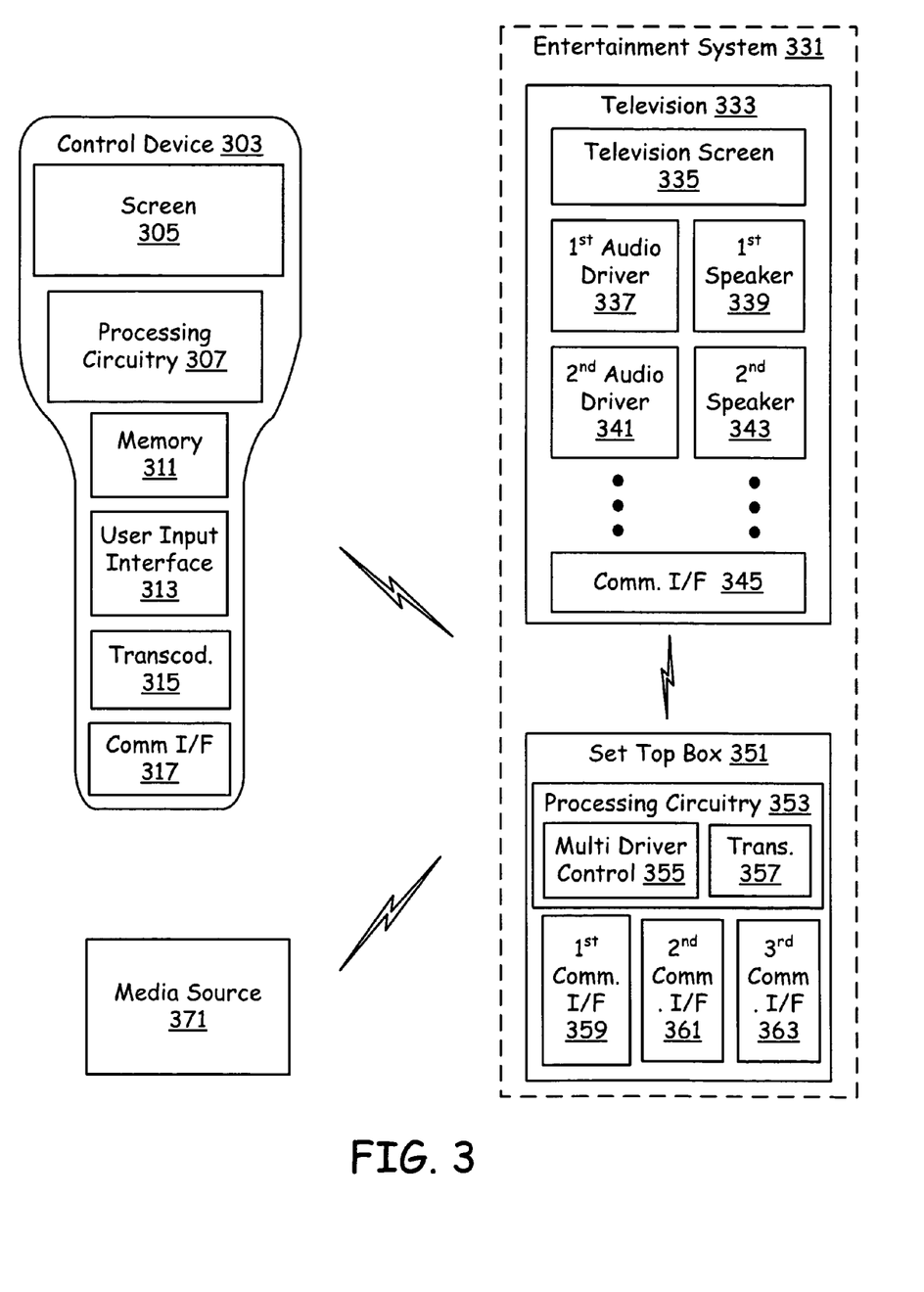
FIG. 3 is a schematic block diagram illustrating an embodiment of the control device of FIG. 2 where the control device interacts with the television having a plurality of audio drivers via a set top box that is housed with the television in the entertainment system.

FIG. 3 is a schematic block diagram illustrating an embodiment of the control device 203 of FIG. 2 where the control device 303 interacts with the television 333 having a plurality of audio drivers via a set top box 351 that is housed with the television 333 in the entertainment system 331. The entertainment system 331 comprises the television 333 and the set top box 351. The television 333 comprises a television screen 335, a plurality of audio drivers and corresponding speakers and a communication interface 345. The set top box 351 comprises a multi driver control unit 355, a transcoding unit 357, a first communication interface 359, a second communication interface 361 and a third communication interface 363. The set top box 351 interacts with the television 333 via the first communication interface 359 over typically an infrared link, an optical fiber, a copper cable, or a Bluetooth or other RF link. The set top box 351 communicates with the control device 303 via the second communication interface 361. The set top box 351 and the control device 303 are communicatively coupled over a wired or a wireless link. The wired link may, for example, be an optical fiber link, an Ethernet link, a copper cable or a twisted pair. The wireless link may, for example, be an infrared link, an Internet link, an Intranet link, a Bluetooth link, a microwave link, a cellular phone link, an IEEE 802.11 link, an IEEE 802.15 link, a standard link or a proprietary link. The set top box 351 interacts with a media source 371 via the third communication interface 363. A communication link between the media source 371 and the set top box 351, for example, comprises characteristics of one or more of an Internet link, an Intranet link, a Bluetooth link, a microwave link or a cellular phone link. The entertainment system 331 is located at a first premises, the control device 303 is located at a second premises and the media source 371 is located at a third premises.

The media source 371 may be, for example, a cable television channel broadcaster, a satellite television channel broadcaster, an Internet media server, an Intranet media server, a DVD or a movie server. The media source 371 stores multimedia elements with audio portions of the multimedia elements in more than one language. Multimedia elements may, for example, be television programs, stored multimedia files, video games or movies. For example and without limitation, the media source 371 is a cable television channel broadcaster that supports multiple languages, and the multimedia elements are a plurality of television programs with audio portions of each of the plurality of television programs stored in a plurality of languages.

The control device 303 receives a first user input that identifies a media guide perusal request. The processing circuitry 307 of the control device 303 responds to the first user input by attempting to retrieve a media guide (e.g., media guide information) from the memory 311 of the control device 303. If the media guide is not available in the memory 311, the processing circuitry 307 generates a first signal and transmits the first signal via the communication interface 317. The set top box 351 receives the first signal via the second communication interface 361. The first signal prompts the set top box 351 to retrieve the media guide from the media source 371 using the third communication interface 363. The media guide identifies a plurality of media elements available with the media source 371. The media source 371 is the cable television channel broadcaster and the media guide is in this case a list of a plurality of television channels (programs). In one embodiment, the media guide is stored in a storage device, and the set top box 351 accesses the storage device to retrieve the media guide. The set top box 351 forwards the media guide to the control device 303 via the second communication interface 361. The control device 303 displays the media guide on the screen 305.

The user input interface 313 subsequently receives a second user input. The second user input identifies a multimedia element and a language guide perusal request. The processing circuitry 307 generates and transmits a second signal via the communication interface 317. The second signal directs the set top box 351 to retrieve a language guide corresponding to the selected multimedia element from the media source 371. The language guide identifies a plurality of languages in which an audio portion of the selected multimedia element is available with the media source 371. The set top box 351 receives the language guide corresponding to the selected multimedia element from the media source 371 via the third communication interface 363. The set top box 351 forwards the language guide to the control device 303 via the second communication interface 361. The control device 303 displays the language guide on the screen 305. A user who interacts with the control device 303 visually learns the plurality of languages in which the audio portion of the selected multimedia element is available.

The user input interface 313 subsequently receives a third user input. The third user input identifies a second plurality of languages. The processing circuitry 307 generates and transmits a third signal triggering the set top box 351 to retrieve the video portion of the selected multimedia element and multiple copies of the audio portion of the selected multimedia element from the media source 371. Each copy of the audio portion of the selected multimedia element is in a separate language as identified by the third user input. The set top box 351 forwards the video portion of the selected multimedia element and the multiple copies of the audio portion of the selected multimedia element in respective languages to the television 333. For example and without limitation, the selected multimedia element is a news program. The second plurality of languages are, for example, English and Chinese. The television 333 displays the video portion of the news program (the video portion of the multimedia element) on the television screen 335. The television 333 plays the audio portion of the news program in the English language in the first speaker 339 and plays the audio portion of the news program in the Chinese language in the second speaker 343. The news program is a real-time multimedia element. The set top box 351 comprises a plurality of tuners (communication interfaces) via which the set top box 351 receives the multiple copies of the audio portion of the news program (multimedia element) from the media source 371. The set top box 351 has a plurality of communication interfaces with the television 333 via which the set top box 351 forwards the multiple copies of the audio portion of the news program to the television 333. The multi-driver control unit 355 of the set top box 351 enables the set top box 351 to interact with the plurality of audio drivers of the television 333.

Figure 4:
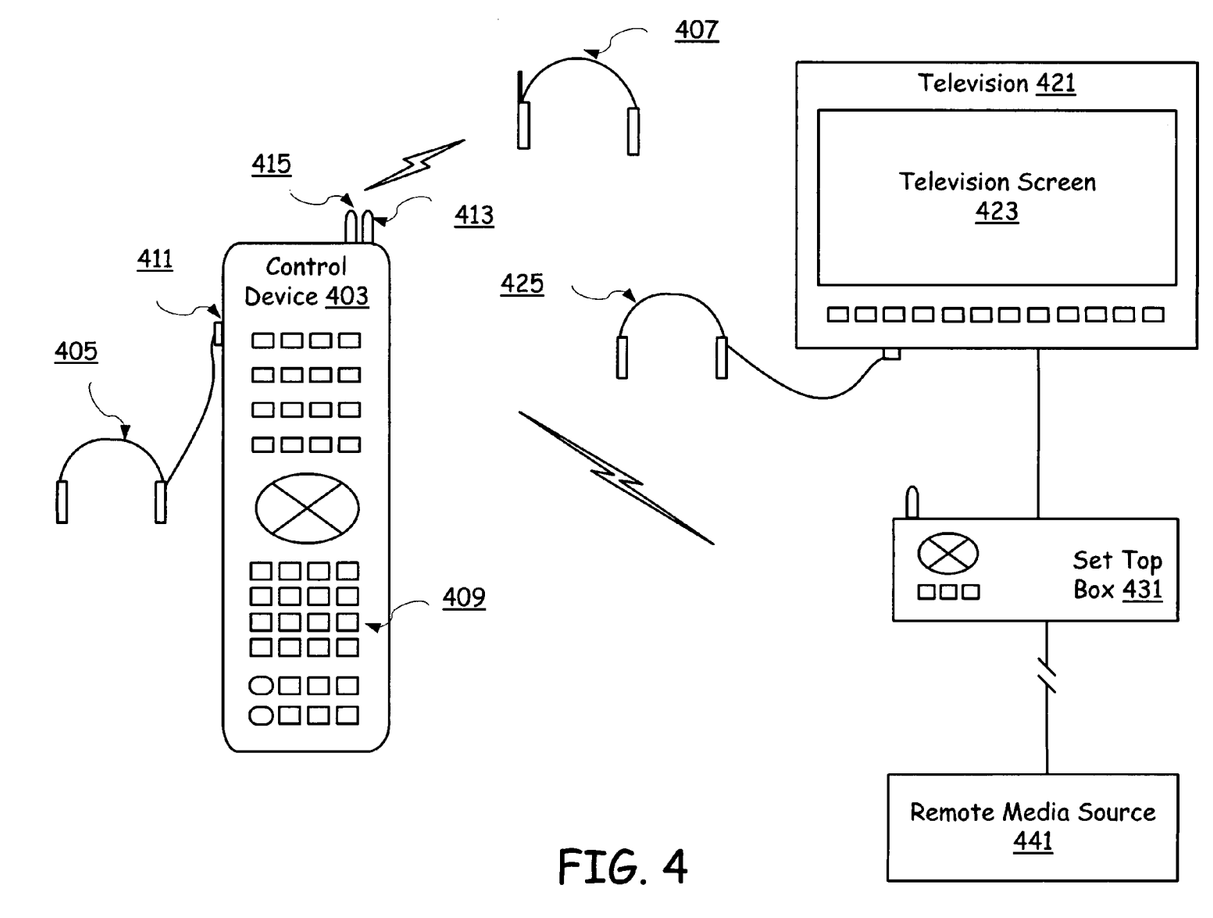
FIG. 4 is a diagram illustrating interaction between a control device and a plurality of speakers where the control device controls selection of a plurality of languages and selection of an audio element in the plurality of languages to be played on the plurality of speakers in accordance with various aspects of the present invention.

FIG. 4 is a diagram illustrating interaction between a control device 403 and a plurality of speakers, 405, 407 and 425 where the control device 403 controls selection of a plurality of languages and selection of an audio element (or multimedia element) to be played on the plurality of speakers, 405, 407 and 425 in the plurality of languages. The control device 403, for example, comprises a plurality of buttons 409 that act as a user input interface. The control device 403 comprises an audio interface 411. An audio speaker 405 is plugged into the audio interface 411. The control device 403 comprises a first wireless interface 413 via which the control device 403 interacts with a set top box 431. The set top box 431 may be, for example, a cable television set top box, a satellite television set top box, a DVD player set top box or a PVR set top box. The control device 403 comprises a second wireless interface 415 via which the control device 403 communicates with a wireless audio speaker 407. The control device 403 and the wireless audio speaker 407 are communicatively coupled via, for example and without limitation, an IEEE 802.11 link, an IEEE 802.15 link, a Bluetooth link, an infrared link or any wireless link corresponding to any standard or proprietary wireless protocol. The control device 403 interacts with the set top box 431 over another wireless link. The control device 403 interacts with another audio speaker 425 that is plugged into an audio interface of television 421. The television 421 comprises a television screen 423, and the television is communicatively coupled to the set top box 431. A communication link between the television 421 and the set top box 431 may be a wired link and/or a wireless link. The set top box 431 receives a media element from a media source 441 and forwards the media element to the television 421 for playing. The control device 403 communicates with the television 421, the audio speaker 425 and the media source 441 via the set top box 431.

For example and without limitation, the media source 441 transmits a plurality of television channels/programs (media elements) that are identified by numbers. The plurality of buttons 409 of the control device 403 correspond to a plurality of functionalities performed by the control device 403. By way of example a first button from the plurality of buttons 409 corresponds to a first television channel from the plurality of television channels. A second button from the plurality of buttons 409 corresponds to a second television channel from the plurality of television channels. A third button, a fourth button and a fifth button from the plurality of buttons 409 correspond to English language, Chinese language and French language respectively. A sixth button, a seventh button and an eighth button from the plurality of buttons 409 correspond to the speaker 405, the wireless speaker 407 and the speaker 425 respectively.

For example, the first button, the third button and the sixth button are selected by a user. The control device 403 understands that the first television channel in English is to be retrieved from the media source 441, the audio portion of the first television channel is to be played on the speaker 405 plugged into the audio interface 411 of the control device 403, and the video portion of the first television channel is to be displayed on the television screen 423. The control device 403 generates and transmits a control signal. The control signal directs the set top box 431 to receive the first television channel from the media source 441 with the audio portion of the first television channel in the English language. The set top box 431 receives and sends the audio portion of the first television channel to the control device 403. The control device 403 plays the audio portion of the first television channel on the audio speaker 405. The set top box 431 forwards the video portion of the first television channel to the television 421 for display on the television screen 423. In one embodiment, the set top box 431 forwards the audio portion as well as the video portion of the first television channel to the control device 403. The control device 403 does not comprise a screen. Only the audio portion of the first television channel is heard in the English language in the speaker 405.

If in the non-limiting example, the fifth button and the eighth button are selected in addition, then the control device 403 understands that the audio portion of the first television channel is to be played in the French language on the speaker 425. The control device 403 transmits a second control signal. The second control signal triggers the set top box 431 to receive the audio portion of the first television channel in the French language and forward it to the television 421. The audio portion of the first television channel is heard in the French language on the speaker 425. Selection of the first button, the third button and the sixth button followed by selection of the fifth button and the eighth button of the control device 403 makes the first television channel appear on the television screen 423 and the audio portion to be heard in the English language on the speaker 405 and to be heard in the French language on the speaker 425.

The user input interface of the control device 403 receives a user input that identifies for example, the second button, the fourth button, the seventh button, the fifth button and the eighth button. The control device 403 infers that the second television channel is to be displayed on the television screen 423 with the audio portion to be played in the French language on the speaker 425 attached to the television 421 and the audio portion to be played in the Chinese language on the wireless speaker 407. The control device 403 transmits a third control signal. The set top box 431 responds to the third control signal by receiving the video portion of the second television channel, a first copy of the audio portion of the second television channel in the French language and a second copy of the audio portion of the same second television channel in the Chinese language from the media source 441. The set top box 431 forwards the video portion of the second television channel to the television screen 423 for display. The set top box 431 forwards the first copy of the audio portion of the second television channel in the French language to the speaker 425. The set top box 431 forwards the second copy of the audio portion of the second television channel in the Chinese language to the control device 403. The control device 403 receives the second copy of the audio portion of the second television channel in the Chinese language via the communication interface 413 from the set top box 431. The control device 403 comprises an audio driver for driving the wireless speaker 407. The control device 403 communicates with the wireless speaker 407 via the communication interface 415. The control device 403 plays the audio portion of the second television channel in the Chinese language on the wireless speaker 407. Consequently, the second television channel appears on the television screen 423 and the audio portion is heard in the French language on the speaker 425 and is heard in the Chinese language on the wireless speaker 407.

Figure 5:
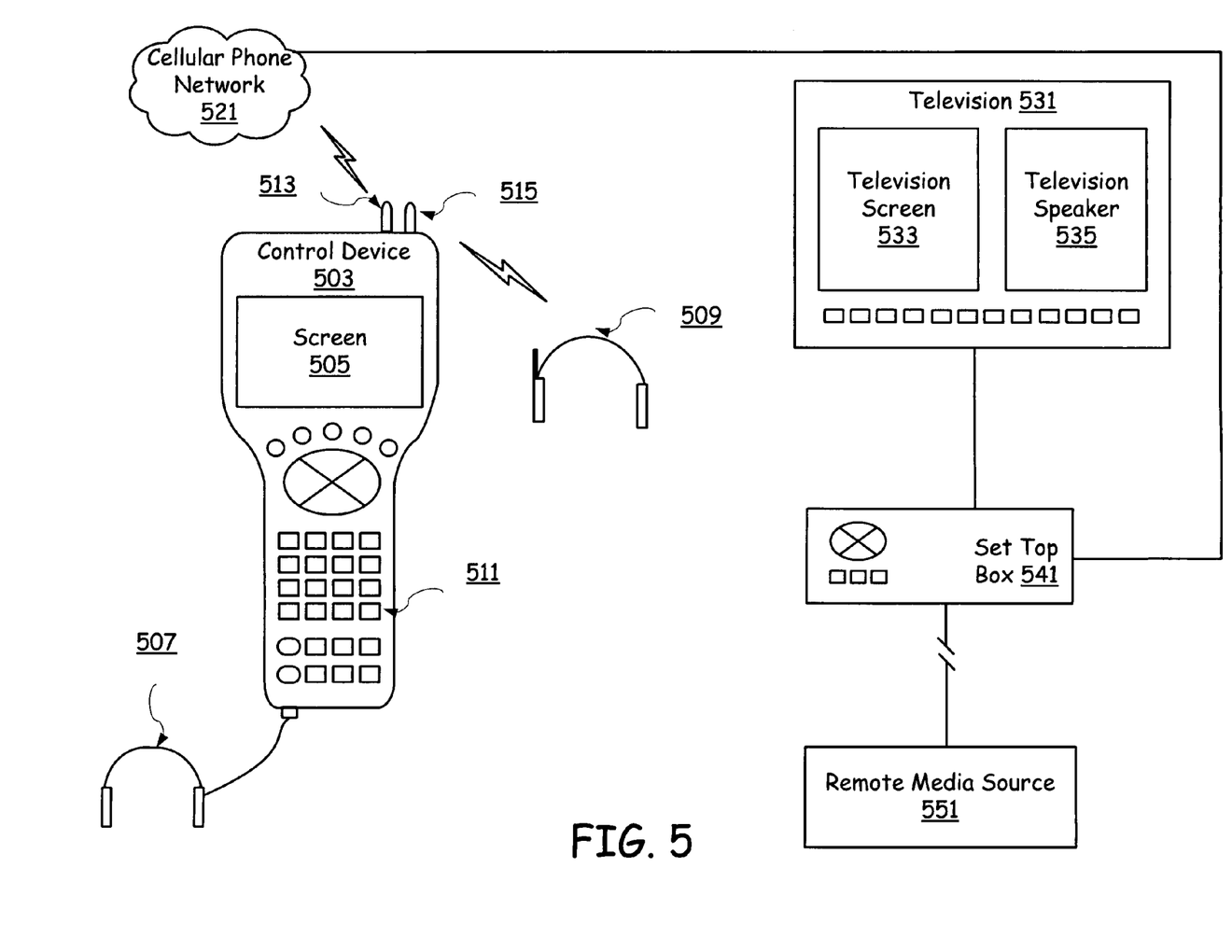
FIG. 5 is a diagram illustrating an embodiment of the control device of FIG. 4 further comprising a screen, and where the control device retrieves the audio element from a remote source via a cellular phone network.

FIG. 5 is a diagram illustrating an embodiment of the control device 403 of FIG. 4 further comprising a screen 505, and where the control device 503 retrieves an audio element (or multimedia element) from a remote source 551 via a cellular phone network 521. The control device 503 controls display of a video element on a television screen 533 of a television 531, and selection of a language and playing of an audio element (or multimedia element) on a television speaker 535 in the selected language by interacting with the television 531 via a set top box 541. The control device 503 communicates with the set top box 541 via the cellular phone network 521. The cellular phone network 521 comprises characteristics of one or more of a GSM network, a GPRS network, an EDGE network, a WCDMA network, a CDMA network or any other standard or proprietary cellular network. The control device 503, in addition, controls selection of languages and selection of audio elements and playing of selected audio elements in selected languages on a tethered speaker 507 and a wireless speaker 509. The video element and the audio element are sourced by the media source 551 that is located at a remote location from the set top box 541 and the control device 503. The television 531 and the set top box 541 are located at the same premises. The control device 503 is located at a first premises, and the set top box 541 is located at a second premises.

The control device 503 comprises, for example, a plurality of buttons 511 that act as a user input interface of the control device 503. Selection of a button from the plurality of buttons 511 triggers the control device 503 to request a media guide from the media broadcaster 551. The control device 503 sends the request for the media guide via cellular phone network interface 513 to the set top box 541. The set top box 541 forwards the request for the media guide to the media source 551. The set top box 541 subsequently receives the media guide from the media source 551 and forwards it to the control device 503. The control device 503 displays the media guide on the control device screen 505. In one embodiment, the control signal may prompt the media guide to be displayed alternately or in addition on the television screen 533. In some embodiments, the screen 505 is a touch screen. A list corresponding to a plurality of media elements (audio elements and video elements) available with the media source 551 is revealed on the touch screen 505. A user may input a media selection by touching the touch screen 505 at an appropriate location.

The control device 503 subsequently receives the media selection. The media selection identifies a media element from the plurality of media elements (audio elements and video elements) available with the media source 551. The control device 503 may receive a language guide perusal request. The control device 503 receives a language guide corresponding to the selected media element from the media broadcaster 551 via the set top box 541 and the cellular phone network 521 and displays the language guide on the screen 505. In some embodiments, the user inputs a language selection by touching the touch screen 505 at an appropriate location. The language guide in some embodiments may reveal a mapping between a plurality of languages and some or all of the plurality of buttons 511. The user, via visual interaction, learns which of the plurality of buttons 511 corresponds to which of the plurality of languages.

In addition to the language selection, the control device 503 receives a speaker selection. The speaker selection identifies on which speaker the selected media element is to be played. For example, the speaker selection together with the language selection identifies that the selected media element is to be played in a first language on the tethered speaker 507, and the selected media element is to be played in a second language on the wireless speaker 509. The control device 503 receives two copies of the media element, one copy in the first language and another copy in the second language, from the media source 551 via the set top box 541 and the cellular phone network 521. The control device 503 drives the tethered speaker 507 and the wireless speaker 509. The control device 503 plays the media element in the first language on the tethered speaker 507 and the same media element in the second language on the wireless speaker 509. The control device 503 communicates with the wireless speaker 509 using communication interface 515. The communication link between the control device 503 and the wireless speaker 509 may be, for example and without limitation, a local area network link, a metropolitan area network link, an Intranet link, an Internet link, a Bluetooth link and an infrared link. In one embodiment, the communication link between the control device 503 and the wireless speaker 509 comprises characteristics of the cellular phone network 521. In the one embodiment the control device 503 is communicatively coupled to the set top box 541 and the wireless speaker 509 via the cellular phone network 521.

Figure 6:
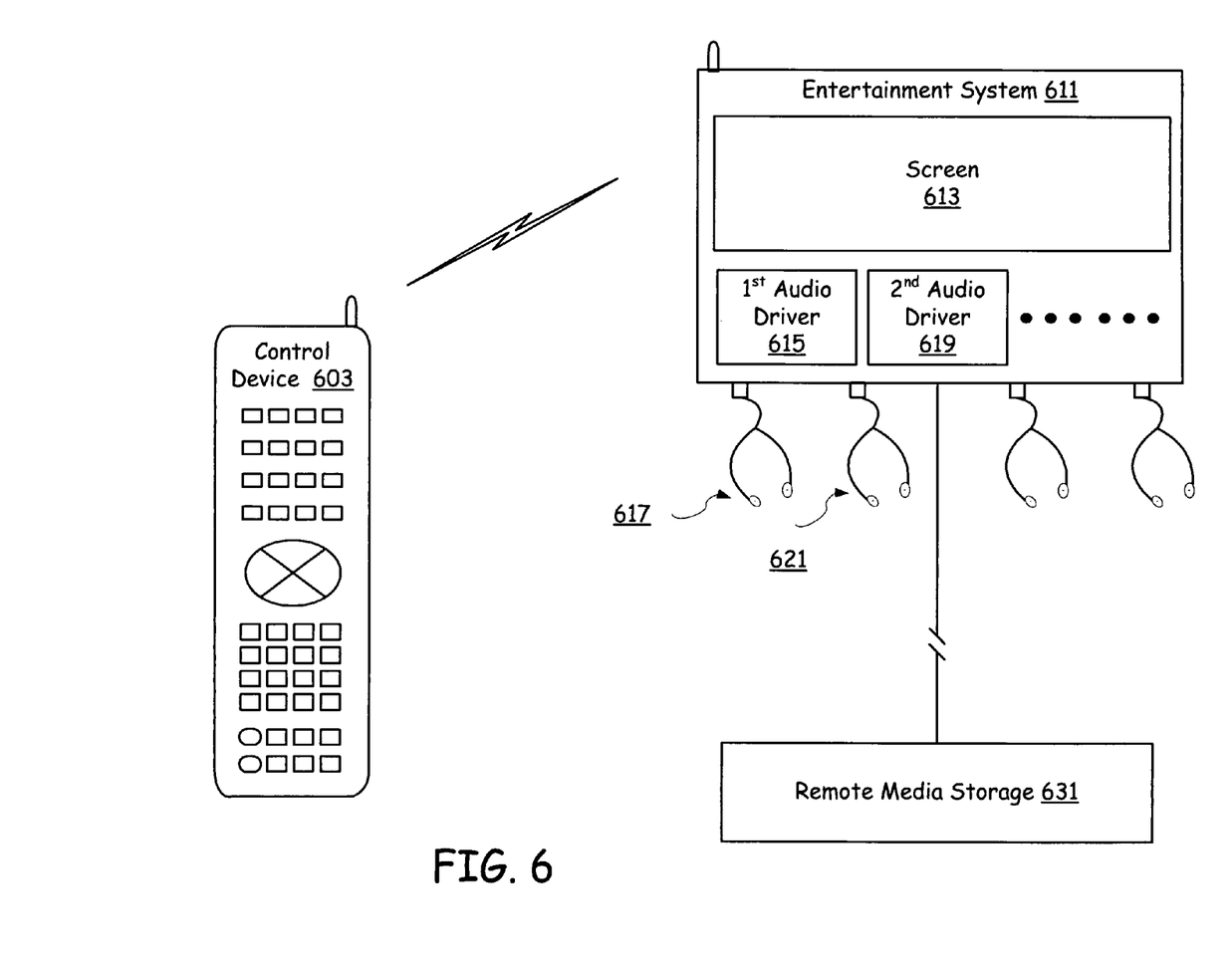
FIG. 6 is a diagram illustrating an embodiment of the control device of FIG. 4 where the plurality of speakers are driven by an entertainment system.

FIG. 6 is a diagram illustrating an embodiment of the control device 403 of FIG. 4 where the plurality of speakers are driven by an entertainment system 611. The entertainment system 611 is located at a first premises, the control device 603 is located at a second premises, and a media storage device 631 is located at a third premises. The entertainment system comprises a screen 613 and a plurality of audio units. Each of the audio units comprises an audio driver and a speaker. A first audio driver 615 and a first speaker 617 comprise a first audio unit from among the plurality of audio units. A second audio driver 619 and a second speaker 621 comprise a second audio unit from among the plurality of audio units. The entertainment system 611 and the control device 603 communicate with each other over a first wireless link. The entertainment system 611 and the media storage device 631 are communicatively coupled to each other via a wired link and/or a second wireless link.

The media storage device 631 stores a plurality of audio elements and/or a plurality of multimedia elements. Each of the multimedia elements comprises an audio portion and a video portion. Typical examples of audio elements are radio programs, music files, songs, music, audio portions of television channels, audio portion of movies, etc. Typical examples of multimedia elements are television programs, movies, multimedia files, multimedia games, recorded multimedia events, music videos, etc. The media storage device 631 may be a television channel broadcaster, a radio channel broadcaster, an Internet server, an Intranet server, a DVD, a VCD, etc. The entertainment system 611 may typically be a television, a home theater, a DVD player, a PVR player, a VCD player, a radio, a personal computer etc. The control device 603 receives a user input via a user input interface of the control device 603. The user input identifies a multimedia element and at least two languages. The control device 603 responds to the user input by directing the entertainment system 611 to receive the video portion of the multimedia element and the audio portion of the multimedia element in the at least two languages simultaneously from the media storage device 631. The entertainment system 611 receives the video portion and the audio portion of the multimedia element in the at least two languages. The entertainment system 611 displays the video portion of the multimedia element on the screen 613 and plays the audio portion of the multimedia element in the at least two languages in separate audio units. For example, if a first language and a second language are identified by the user input, the entertainment system 611 plays the audio portion of the multimedia element in the first language on the first speaker 617 and plays the audio portion of the multimedia element in the second language on the second speaker 621 simultaneously. A first user who understands only the first language and a second user who understands only the second language watch the video portion on the screen 613 and listen to the audio portion in the first language and in the second language on two different speakers (e.g., headsets) 617 and 621 respectively.

Figure 7:
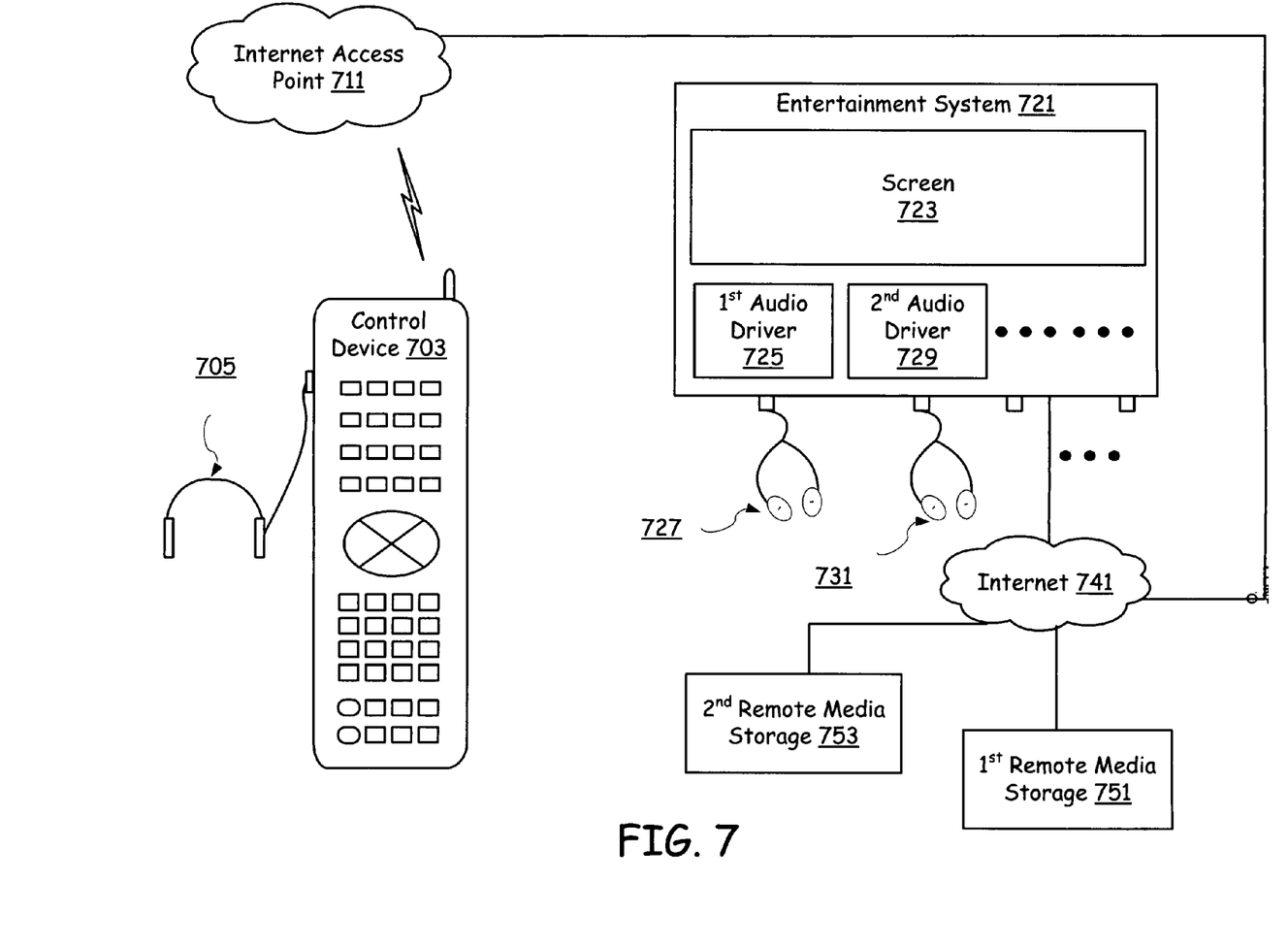
FIG. 7 is a diagram illustrating an embodiment of the control device of FIG. 4 where the control device retrieves the audio element from a remote source via Internet.

FIG. 7 is a diagram illustrating an embodiment of the control device 403 of FIG. 4 where the control device 703 retrieves the audio element from a remote source via Internet 741. The control device 703 comprises a first IP (Internet protocol) address. The control device 703 is communicatively coupled to the Internet 741 via an Internet access point 711. Any device having an IP address communicates to the control device 703 using the first IP address of the control device 703 via the Internet 741. The control device 703 is communicatively coupled to the Internet access point 711 via a wired link, for example, an Ethernet cable, an optical fiber, a coaxial cable etc. and/or via a wireless link, for example, a Bluetooth link, an IEEE 802.11 link, an IEEE 802.15 link, etc. An entertainment system 721 is communicatively coupled to the Internet 741. The entertainment system 721 comprises a screen 723 and a plurality of audio units. Each of the audio units comprises an audio driver and a speaker. A first audio driver 725 and a first speaker 727 comprise a first audio unit. A second audio driver 729 and a second speaker 731 comprise a second audio unit. The entertainment system 721 has a second IP address. Any device having an IP address communicates with the entertainment system 721 using the second IP address of the entertainment system 721 via the Internet 741. The entertainment system 721 and the control device 703 interact with each other via the Internet 741 using the first IP address and the second IP address. A first media storage device 751 and a second media storage device 753 are connected to the Internet 741. The first media storage device 751 and the second media storage device 753 are, for example and without limitation, one or more of a commercial online music offering, a commercial online movie repository, online multimedia game server, an Internet server, an Intranet server, a DVD, a VCD, etc. The control device 703 comprises an audio port via which a speaker 705 is connected. The control device 703 comprises an audio driver that drives the speaker 705.

The control device 703 has, in one embodiment, a plurality of buttons via which a user inputs a selection. The selection may identify a media element, a language, a setting change request, etc. A first group of the plurality of buttons corresponds to a plurality of media elements stored in the first media storage device 751 and the second media storage device 753. For example and without limitation, the first media storage device 751 is a commercial online music offering. The first media storage device 751 stores a plurality of songs. For example and without limitation, the second media storage device 753 is a server owned by a television broadcaster. The second media storage device 753 stores a plurality of television programs. A second group of the plurality of buttons corresponds to a plurality of languages. Selection of a button belonging to the second group of the plurality of buttons triggers the control device 703 to retrieve a media element in a corresponding language from one of the storage devices 751 or 753. A third group of the plurality of buttons corresponds to the speakers attached to the entertainment system 721 and the control device 703 (727, 731, 705). Selection of a button belonging to the third group of the plurality of buttons results in playing a selected multimedia element on a corresponding speaker (727 or 731 or 705). A fourth group of the plurality of buttons corresponds to a plurality of setting changes. For example and without limitation, a first button from the fourth group of the plurality of buttons corresponds to an increase in volume of the speaker 705, a second button from the fourth group of the plurality of buttons correspond to an increase in volume of the speaker 727, a third button from the fourth group of the plurality of buttons corresponds to an increase in brightness of the screen 723, etc.

The control device 703 receives a selection of a combination of buttons belonging to the first group, the second group and the third group of the plurality of buttons. Depending on the selection, the control device 703 directs the entertainment system 721 to receive a media element from any of the two media storage devices, 751 and 753, in a plurality of languages and play an audio portion of the media element in different languages on the plurality of speakers, 727, 731, etc., and display a video portion of the media element, if any, on the screen 723. The control device 703, in addition or alternately, may receive the multimedia element or a second multimedia element from any of the two media storage devices, 751 and 753, and play an audio portion of a received multimedia element on the speaker 705.

Figure 8:
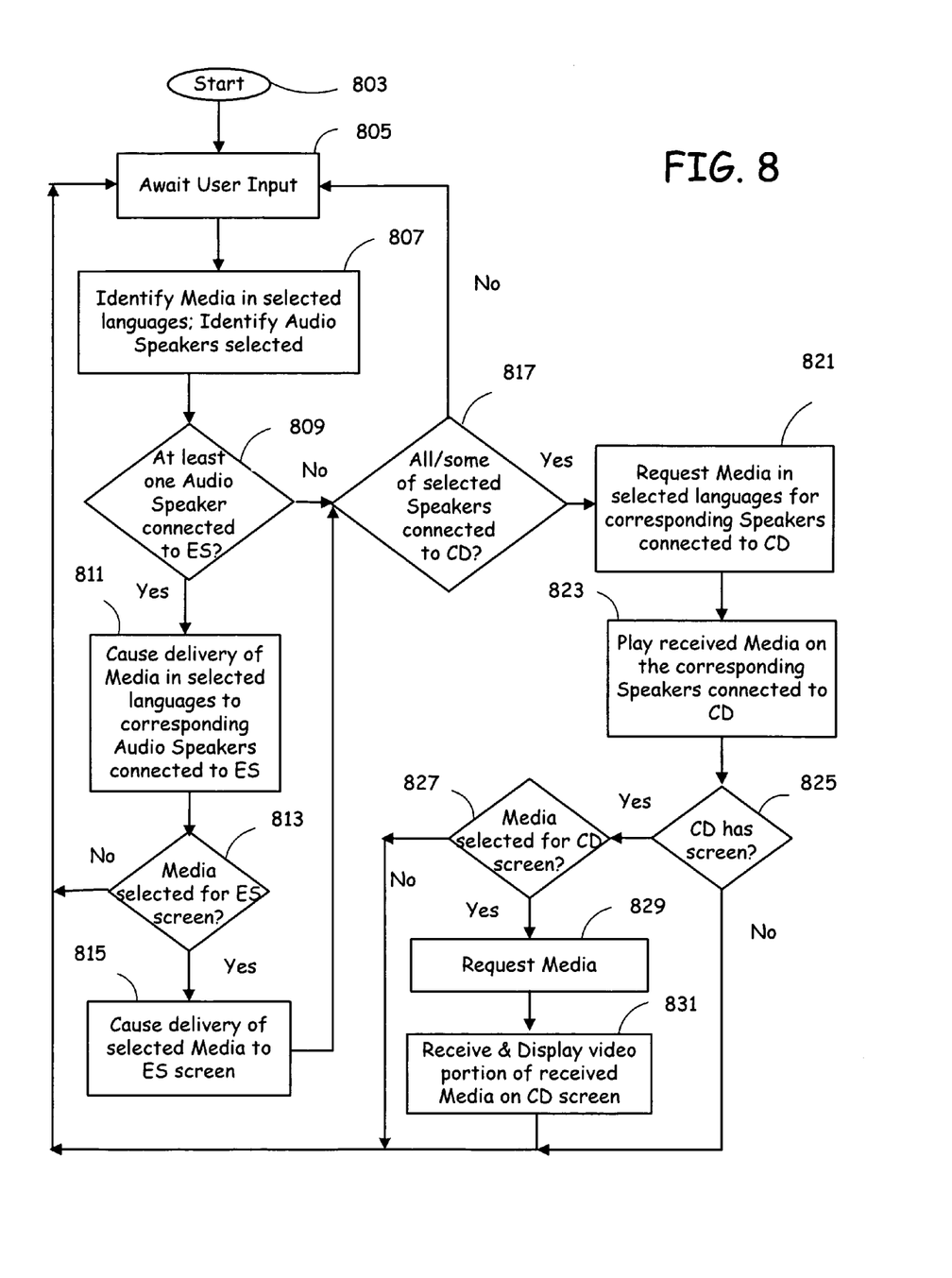
FIG. 8 is a flowchart illustrating functions of media selection and language selection performed by a control device according to one embodiment of the present invention.

FIG. 8 is a flowchart illustrating functions of media selection and language selection performed by a control device. The operation starts at step 803. The control device awaits user input as shown in step 805. The control device identifies media elements selected, languages selected and corresponding speakers selected by a user using the user input in next step 807. The media elements may reside in one or more than one premises. Each of the media elements may have an audio portion and a video portion or only an audio portion. The speakers may reside in one or more than one premises. The speakers are driven either by the control device or by an entertainment system. The entertainment system comprises a screen. The control device may comprise a second screen.

In the next step 809, the control device determines if at least one of the speakers identified by the user input is communicatively coupled to the entertainment system. If at least one of the speakers is communicatively coupled to the entertainment system, then the control device transmits a control signal causing delivery of the selected media element in the selected language to the at least one of the speakers communicatively coupled to the entertainment system as shown in step 811. Next, the control device determines if any media element has been selected for the screen of the entertainment system in query step 813. If the control device determines that no media element has been selected for the screen of the entertainment system, then process control jumps to step 805 where the control device awaits another user input. If the result of query step 813 is positive, then the control device transmits a second control signal causing delivery of the media element selected for the screen of the entertainment system to the entertainment system, as shown in step 815.

In step 809, the control device finds that the at least one of the speakers identified by the user input is communicatively coupled to the entertainment system. The rest of the speakers identified by the user input may be communicatively coupled to the control device. If none of the speakers is communicatively coupled to the entertainment system then all of the selected speakers may be communicatively coupled to the control device. After step 815, the control device jumps to query step 817. Also, if the result of query 809 is negative then the control device jumps to the query step 817. In the query step 817, the control device ascertains if at least one of the speakers identified by the user input is communicatively coupled to the control device. If none of the speakers is communicatively coupled to the control device, then the process control jumps to step 805 and the control device awaits the another user input. If the control device determines that at least one of the speakers is communicatively coupled to the control device, then in step 821, the control device requests media elements in corresponding selected languages for corresponding speakers communicatively coupled to the control device. In next step 823, the control device plays the received media elements on the corresponding speakers. If the control device does not have a screen, the control device jumps to step 805 and awaits the another user input.

If the control device comprises a screen then the control device determines if a media element is selected for the screen of the control device as shown in query step 827. The process control goes to step 805 if the result of query 827 is negative. The control device requests a media element in step 829 if the result of query step 827 is positive. Next, the control device displays the media element on the screen of the control device as shown in step 831. The process control goes to step 805 and the control device awaits the another user input.

Figure 9:
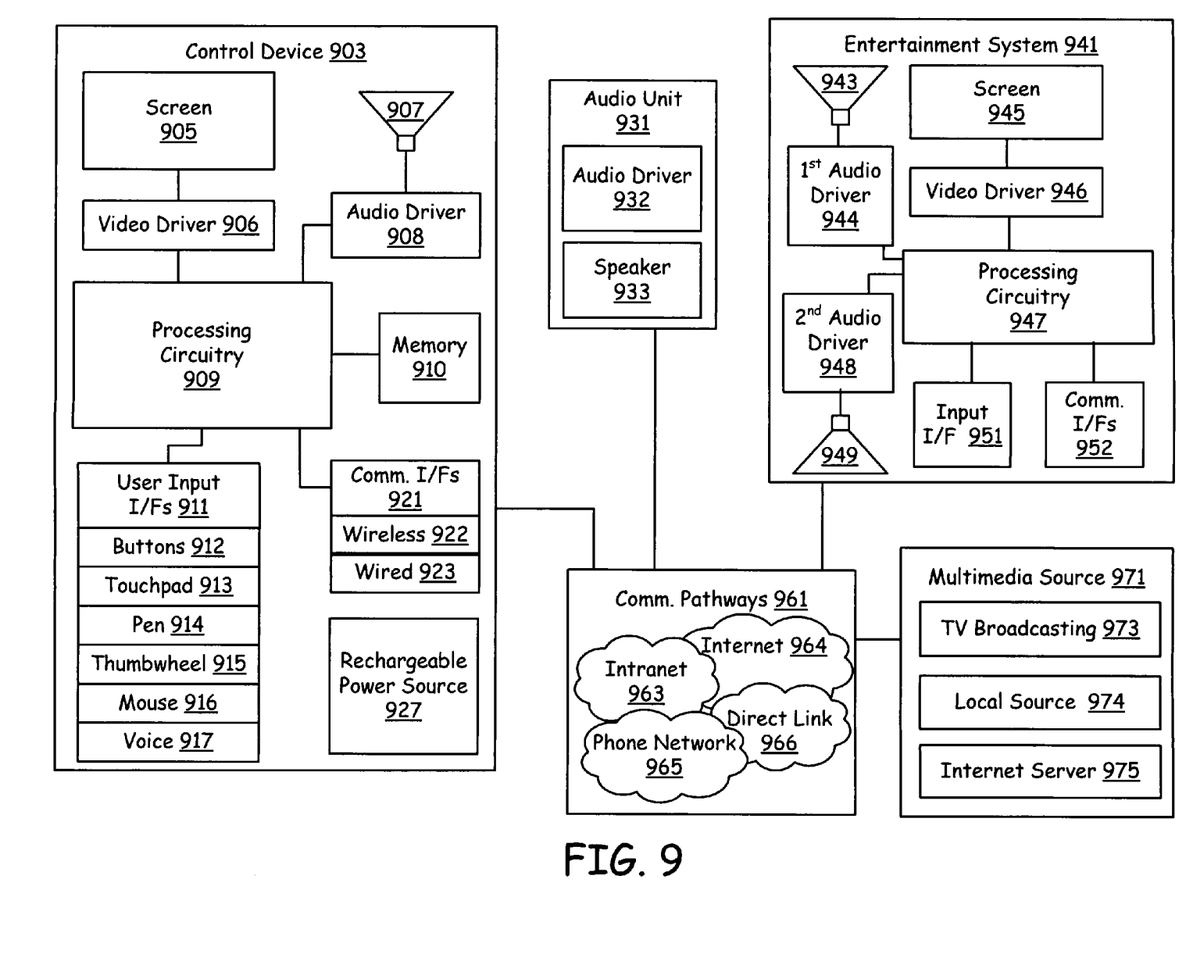
FIG. 9 is a schematic block diagram illustrating communication pathways between a multimedia source, an entertainment system, an audio unit and a control that controls selection of a language and delivery of media to the entertainment system in the language.

FIG. 9 is a schematic block diagram illustrating communication pathways between a multimedia source 971, an entertainment system 941, an audio unit 931 and a control device 903 that controls selection of a language and delivery of media to the entertainment system 941 in the selected language. The entertainment system 941 comprises a display screen 945 and a first audio unit and a second audio unit. A first audio speaker 943 and a first audio driver 944 are parts of the first audio unit. A second audio speaker 949 and a second audio driver 948 are parts of the second audio unit. The first audio unit and the second audio unit may comprise a piece of software that plays an audio element. In some embodiments, the entertainment system 941 comprises additional audio units. The control device 903 drives the audio unit 931. The control device 903 communicates with the audio unit 931 via the communication pathways 961.

The term "communicatively coupled," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

The functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

We claim:

1. A control system that interacts with a media source, where the media source services a first speaker device, the control system comprising:
 a remote control device comprising:
 a remote control audio output;
 a user input interface operable to receive a user input identifying a first language;
 a communication interface; and
 at least one module operable to:
 transmit a control signal via the communication interface, where the control signal is adapted to trigger delivery of an audio element in the first language from the media source to the first speaker device;
 receive, via the communication interface, the audio element in a second language; and
 output the received audio element in the second language via the remote control audio output.

2. The control system according to claim 1, wherein the remote control audio output comprises a wireless audio output that operates to communicatively couple to a wireless audio device.

3. The control system according to claim 1, where:
 the remote control device comprises a screen;
 the at least one module operates to display a language guide on the screen, and
 the user input identifying the first language is based on user selection of the first language from the language guide displayed on the screen.

4. The control system according to claim 1, where the remote control device is located at a first premises, and the first speaker device is located at a second premises different from the first premises.

5. A control system that interacts with an entertainment system, the entertainment system comprising a screen and at least one audio unit, the control system comprising:
 a remote control device comprising:
 a remote control screen;
 a communication interface;
 a user input interface; and
 at least one module operable to:
 display a language guide on the remote control screen;
 receive, via the user input interface, a user selection of a first language from the language guide displayed on the remote control screen; and
 transmit a control signal that is adapted to trigger delivery of a video portion of a media element to the screen of the entertainment system and an audio portion of the media element in the selected first language to the at least one audio unit of the entertainment system.

6. The control system according to claim 5, wherein the at least one module operates to:
 display a media selection guide on the remote control screen; and
 receive, via the user input interface, a user media selection from the displayed media selection guide that identifies the media element from a plurality of media elements.

7. The control system according to claim 5, where the entertainment system comprises a second audio unit, and the at least one module of the remote control device is operable to transmit a second control signal that directs delivery of the audio portion of the media element in a second language to the second audio unit of the entertainment system, where both of the audio portion of the media element in the first language and the audio portion of the media element in the second language correspond to the video portion of the media element presently being displayed on the screen of the entertainment system.

8. The control system according to claim 5, wherein the user input interface of the remote control device operates to receive a language guide perusal request that prompts the at least one module of the remote control device to transmit a third control signal directing display of a language guide on the screen of the entertainment system.

9. The control system according to claim 8, wherein a second user input identifying a second language is based on the language guide displayed on the screen of the entertainment system.

10. The control system according to claim 5, wherein the remote control device comprises a speaker, and wherein the at least one module is operable to:
retrieve via the communication interface the audio portion of the media element in a third language; and
play the audio portion of the media element in the third language on the speaker of the remote control device.

11. A control system that interacts with an entertainment system having at least one audio unit, the control system comprising:
a remote control device comprising:
a remote control screen;
a communication interface;
a user input interface; and
at least one module operable to:
receive, via the communication interface; a list identifying a plurality of media elements and a plurality of languages in which the plurality of media elements are available;
display the received list on the remote control screen;
receive, via the user input interface, a media selection and a language selection from the displayed list; and
transmit a control signal via the communication interface that triggers delivery of a media element in a language to the at least one audio unit of the entertainment system, where the media element corresponds to the media selection and the language corresponds to the language selection.

12. The control system according to claim 11, wherein:
the at least one module is operable to receive, via the user input interface, a second media selection different from said media selection; and
display a second media element received via the communication interface and corresponding to the second media selection on the remote control screen.

13. The control system according to claim 11, wherein the remote control device comprises a memory that stores the received list.

14. A control system that interacts with a television located at a first premises and a second audio unit located at a second premises, the television having a first audio unit and a first video display, the control system comprising:
a remote control device comprising:
a user input interface that operates to receive a user input that identifies a media element, a first language for the media element and a second language for the media element;
a communication interface that operates to receive a video portion of the media element;
a second video display that operates to display the video portion of the media element; and
at least one module that operates to:
transmit a first control signal directing delivery of the video portion of the media element to the first video display and delivery of an audio portion of the media element in the first language to the first audio unit; and
transmit a second control signal triggering delivery of an audio portion of the media element in the second language to the second audio unit.

15. The control system according to claim 14, wherein the remote control device is located at the second premises.

16. The control system according to claim 15, wherein the remote control device operates to interact with the television via set top box circuitry located at the first premises.

17. A method performed by a control system through interaction with a media source, the media source servicing a first speaker device, the method comprising:
in a remote control device:
receiving a user input;
identifying a first language and a second language corresponding to the user input; and
responding to the user input by, at least:
transmitting a control signal via a communication interface of the remote control device, where the control signal is adapted to trigger delivery of an audio element in the first language from the media source to the first speaker device;
receiving, via a communication interface of the remote control device, said audio element in the second language; and
outputting said received audio element in the second language via an audio output of the remote control device.

18. The method according to claim 17, wherein outputting said audio element in the second language via an audio output of the remote control device comprises wirelessly outputting said audio element in the second language to a wireless audio device.

19. The method according to claim 17, comprising, in the remote control device:
displaying a language guide on a screen of the remote control device, the language guide revealing a plurality of selectable languages: and
receiving said user input via the displayed language guide.

20. A method performed by a control system through interaction with an entertainment system comprising a screen and at least one audio unit, the method comprising:
in a remote control device:
displaying a language guide on a screen of the remote control device;
receiving a user input via the displayed language guide;
identifying a first language corresponding to the user input; and
responding to the user input by transmitting a control signal triggering delivery of a video portion of a media element to the screen of the entertainment system and an audio portion of the media element in the selected first language to the at least one audio unit of the entertainment system.

21. The method according to claim 20, further comprising:
displaying a media selection guide on the screen of the remote control device;
receiving a media selection via the displayed media selection guide; and
identifying the media element from a plurality of media elements based on the received media selection.

22. A method performed by a control system through interaction with an entertainment system, the entertainment system comprising at least one audio unit, the method comprising:
- in a remote control device:
  - receiving a list identifying a plurality of media elements and a plurality of languages in which the plurality of media elements are available;
  - displaying the received list on a screen housed with the remote control device;
  - receiving, via a user input interface, a media selection and a language selection from the displayed list;
  - identifying a media element from the plurality of media elements based on the media selection;
  - identifying a language from the plurality of languages based on the language selection; and
  - transmitting a control signal via a communication interface of the control device directing delivery of the identified media element in the identified language to the at least one audio unit of the entertainment system.

23. A method performed by a control system via interaction with a television located at a first premises and a second audio unit located at a second premises, the television comprising a first audio unit and a first video display, the method comprising:
- in a remote control device:
  - receiving a user input that identifies a media element, a first language for the media element and a second language for the media element;
  - receiving a video portion of the media element through a first communication interface;
  - displaying the video portion of the media element on a second video display housed with the remote control device; and
  - responding to the user input by:
    - transmitting a first control signal directing delivery of the video portion of the media element to the first video display and delivery of an audio portion of the media element in the first language to the first audio unit; and
    - transmitting a second control signal triggering delivery of an audio portion of the media element in the second language to the second audio unit.

* * * * *